United States Patent
Johnson et al.

(10) Patent No.: US 8,065,439 B1
(45) Date of Patent: Nov. 22, 2011

(54) SYSTEM AND METHOD FOR USING METADATA IN THE CONTEXT OF A TRANSPORT OFFLOAD ENGINE

(75) Inventors: Michael Ward Johnson, Livermore, CA (US); Andrew Currid, Alameda, CA (US); Mrudula Kanuri, Santa Clara, CA (US); John Shigeto Minami, Honolulu, HI (US)

(73) Assignee: NVIDIA Corporation, Santa Clara, CA (US)

( * ) Notice: Subject to any disclaimer, the term of this patent is extended or adjusted under 35 U.S.C. 154(b) by 1534 days.

(21) Appl. No.: 10/742,352

(22) Filed: Dec. 19, 2003

(51) Int. Cl.
   *G06F 15/16* (2006.01)
   *G06F 15/177* (2006.01)
(52) U.S. Cl. ............ 709/250; 709/217; 709/220
(58) Field of Classification Search ........... 709/225, 709/226, 227, 250, 220, 217; 714/758
   See application file for complete search history.

(56) References Cited

U.S. PATENT DOCUMENTS

| | | | |
|---|---|---|---|
| 212,889 A | 3/1879 | Bridenthal, Jr. et al. | |
| 4,807,111 A | 2/1989 | Cohen et al. | 364/200 |
| 4,839,851 A | 6/1989 | Maki | 364/900 |
| 5,012,489 A | 4/1991 | Burton et al. | 375/8 |
| 5,056,058 A | 10/1991 | Hirata et al. | 364/900 |
| 5,161,193 A | 11/1992 | Lampson et al. | 380/49 |
| 5,163,131 A | 11/1992 | Row et al. | 395/200 |
| 5,307,413 A | 4/1994 | Denzer | 380/49 |
| 5,426,694 A | 6/1995 | Hebert | 379/242 |
| 5,430,727 A | 7/1995 | Callon | 370/85.13 |
| 5,440,551 A | 8/1995 | Suzuki | 370/60 |
| 5,455,599 A | 10/1995 | Cabral et al. | 345/133 |
| 5,485,460 A | 1/1996 | Schrier et al. | 370/94.1 |
| 5,495,480 A | 2/1996 | Yoshida | 370/60 |
| 5,499,353 A | 3/1996 | Kadlec et al. | 395/445 |
| 5,513,324 A | 4/1996 | Dolin, Jr. et al. | 395/200.18 |
| 5,519,704 A | 5/1996 | Farinacci et al. | 370/85.13 |
| 5,544,357 A | 8/1996 | Huei | 395/600 |
| 5,546,453 A | 8/1996 | Hebert | 379/242 |
| 5,566,170 A | 10/1996 | Bakke et al. | 370/60 |
| 5,577,105 A | 11/1996 | Baum et al. | 379/93 |
| 5,577,172 A | 11/1996 | Vatland et al. | 395/114 |
| 5,577,237 A | 11/1996 | Lin | 395/555 |
| 5,579,316 A | 11/1996 | Venters et al. | 370/94.1 |
| 5,581,686 A | 12/1996 | Koppolu et al. | 395/340 |
| 5,596,702 A | 1/1997 | Stucka et al. | 395/340 |
| 5,598,410 A | 1/1997 | Stone | 370/469 |
| 5,619,650 A | 4/1997 | Bach et al. | 395/200.01 |
| 5,621,434 A | 4/1997 | Marsh | 345/145 |

(Continued)

FOREIGN PATENT DOCUMENTS

AU 4595297 5/1998

(Continued)

OTHER PUBLICATIONS

Applicant Admitted Prior Art (Specificiaton background, p. 1-2).*

(Continued)

*Primary Examiner* — Karen Tang
(74) *Attorney, Agent, or Firm* — Zilka-Kotab, PC

(57) ABSTRACT

A system, method, and related data structure are provided for transmitting data in a network. Included is a data object (i.e. metadata) for communicating between a first network protocol layer and a second network protocol layer. In use, the data object facilitates network communication management utilizing a transport offload engine.

35 Claims, 8 Drawing Sheets

U.S. PATENT DOCUMENTS

| | | | |
|---|---|---|---|
| 5,625,678 A | 4/1997 | Blomfield-Brown | 379/93 |
| 5,625,825 A | 4/1997 | Rostoker et al. | 395/730 |
| 5,634,015 A | 5/1997 | Chang et al. | 395/309 |
| 5,636,371 A | 6/1997 | Yu | 395/500 |
| 5,640,394 A | 6/1997 | Schrier et al. | 370/389 |
| 5,650,941 A | 7/1997 | Coelho et al. | 364/514 |
| 5,663,951 A | 9/1997 | Danneels et al. | 370/230 |
| 5,664,162 A | 9/1997 | Dye | 345/521 |
| 5,666,362 A | 9/1997 | Chen et al. | 370/420 |
| 5,675,507 A | 10/1997 | Bobo, II | 364/514 |
| 5,678,060 A | 10/1997 | Yokoyama et al. | 395/831 |
| 5,680,605 A | 10/1997 | Torres | 395/603 |
| 5,684,954 A | 11/1997 | Kaiserswerth et al. | 395/200.2 |
| 5,687,314 A | 11/1997 | Osman et al. | 395/200 |
| 5,696,899 A | 12/1997 | Kalwitz | 395/200.1 |
| 5,699,350 A | 12/1997 | Kraslavsky | 370/254 |
| 5,701,316 A | 12/1997 | Alferness et al. | 371/53 |
| 5,727,149 A | 3/1998 | Hirata et al. | 395/200.8 |
| 5,734,852 A | 3/1998 | Zias et al. | 395/334 |
| 5,734,865 A | 3/1998 | Yu | 395/500 |
| 5,748,905 A | 5/1998 | Hauser et al. | 395/200.79 |
| 5,754,540 A | 5/1998 | Liu et al. | 370/315 |
| 5,754,556 A | 5/1998 | Ramseyer et al. | 371/10.3 |
| 5,754,768 A | 5/1998 | Brech et al. | 395/200.6 |
| 5,761,281 A | 6/1998 | Baum et al. | 379/93.29 |
| 5,778,178 A | 7/1998 | Arunachalam | 395/200.33 |
| 5,790,546 A | 8/1998 | Dobbins et al. | 370/400 |
| 5,790,676 A | 8/1998 | Ganesan et al. | 380/23 |
| 5,802,287 A | 9/1998 | Rostoker et al. | 395/200.8 |
| 5,802,306 A | 9/1998 | Hunt | 395/200.58 |
| 5,805,816 A | 9/1998 | Picazo, Jr. et al. | 395/200.53 |
| 5,809,235 A | 9/1998 | Sharma et al. | 395/200.6 |
| 5,815,516 A | 9/1998 | Aaker et al. | 371/53 |
| 5,818,935 A | 10/1998 | Maa | 380/20 |
| 5,826,032 A | 10/1998 | Finn et al. | 395/200.66 |
| 5,854,750 A | 12/1998 | Phillips et al. | 364/478.04 |
| 5,870,549 A | 2/1999 | Bobo, II | 395/200.36 |
| 5,870,622 A | 2/1999 | Gulick et al. | 395/800.35 |
| 5,872,919 A | 2/1999 | Wakeland | 395/200.6 |
| 5,877,764 A | 3/1999 | Feitelson et al. | 345/347 |
| 5,894,557 A | 4/1999 | Bade et al. | 395/200.58 |
| 5,909,546 A | 6/1999 | Osborne | 395/200.42 |
| 5,918,051 A | 6/1999 | Savitzky et al. | 395/683 |
| 5,920,732 A | 7/1999 | Riddle | 395/876 |
| 5,923,892 A | 7/1999 | Levy | 395/800.31 |
| 5,935,268 A | 8/1999 | Weaver | 714/758 |
| 5,937,169 A | 8/1999 | Connery et al. | 395/200.8 |
| 5,941,988 A | 8/1999 | Bhagwat et al. | 713/201 |
| 5,943,481 A | 8/1999 | Wakeland | 395/200.6 |
| 5,946,487 A | 8/1999 | Dangelo | 395/705 |
| 5,966,534 A | 10/1999 | Cooke et al. | 395/705 |
| 5,968,161 A | 10/1999 | Southgate | 712/37 |
| 5,974,518 A | 10/1999 | Nogradi | 711/173 |
| 5,991,299 A | 11/1999 | Radogna et al. | 370/392 |
| 5,999,974 A | 12/1999 | Ratcliff et al. | 709/224 |
| 6,014,699 A | 1/2000 | Ratcliff et al. | 709/224 |
| 6,034,963 A | 3/2000 | Minami et al. | 370/401 |
| 6,046,980 A | 4/2000 | Packer | 370/230 |
| 6,049,857 A | 4/2000 | Watkins | 711/207 |
| 6,061,368 A | 5/2000 | Hitzelberger | 370/537 |
| 6,061,742 A | 5/2000 | Stewart et al. | 709/250 |
| 6,076,115 A | 6/2000 | Sambamurthy et al. | 709/250 |
| 6,078,736 A | 6/2000 | Guccione | 395/500.17 |
| 6,081,846 A | 6/2000 | Hyder et al. | 709/250 |
| 6,092,110 A | 7/2000 | Maria et al. | 709/225 |
| 6,092,229 A | 7/2000 | Boyle et al. | 714/748 |
| 6,098,188 A | 8/2000 | Kalmanek, Jr. et al. | 714/746 |
| 6,101,543 A | 8/2000 | Alden et al. | 709/229 |
| 6,122,670 A | 9/2000 | Bennett et al. | 709/236 |
| 6,151,625 A | 11/2000 | Swales et al. | 709/218 |
| 6,157,955 A | 12/2000 | Narad et al. | 709/228 |
| 6,172,980 B1 | 1/2001 | Flanders et al. | 370/401 |
| 6,172,990 B1 | 1/2001 | Deb et al. | 370/474 |
| 6,173,333 B1 | 1/2001 | Jolitz et al. | 709/240 |
| 6,182,228 B1 | 1/2001 | Boden | 713/201 |
| 6,185,619 B1 | 2/2001 | Joffe et al. | 709/229 |
| 6,208,651 B1 | 3/2001 | Van Renesse et al. | 370/392 |
| 6,226,680 B1 * | 5/2001 | Boucher et al. | 709/230 |
| 6,230,193 B1 | 5/2001 | Arunkumar et al. | 709/218 |
| 6,233,626 B1 | 5/2001 | Swales et al. | 710/11 |
| 6,247,060 B1 * | 6/2001 | Boucher et al. | 709/238 |
| 6,247,068 B1 | 6/2001 | Kyle | 709/328 |
| 6,247,173 B1 * | 6/2001 | Subrahmanyam | 717/160 |
| 6,327,625 B1 | 12/2001 | Wang et al. | 709/235 |
| 6,330,659 B1 | 12/2001 | Poff et al. | 712/34 |
| 6,334,153 B2 | 12/2001 | Boucher | 709/230 |
| 6,341,129 B1 | 1/2002 | Schroeder et al. | 370/354 |
| 6,345,301 B1 | 2/2002 | Burns et al. | 709/230 |
| 6,347,347 B1 | 2/2002 | Brown et al. | 710/23 |
| 6,389,479 B1 | 5/2002 | Boucher | 709/243 |
| 6,389,537 B1 | 5/2002 | Davis et al. | 713/187 |
| 6,393,487 B2 | 5/2002 | Boucher | 709/238 |
| 6,397,316 B2 | 5/2002 | Fesas, Jr. | 711/200 |
| 6,427,169 B1 | 7/2002 | Elzur | 709/224 |
| 6,427,171 B1 | 7/2002 | Craft | 709/230 |
| 6,427,173 B1 | 7/2002 | Boucher | 709/238 |
| 6,430,628 B1 | 8/2002 | Connor | 710/5 |
| 6,434,620 B1 | 8/2002 | Boucher | 709/230 |
| 6,460,080 B1 | 10/2002 | Shah et al. | 709/224 |
| 6,470,415 B1 | 10/2002 | Starr | 711/104 |
| 6,530,061 B1 | 3/2003 | Labatte | 714/807 |
| 6,591,302 B2 | 7/2003 | Boucher | 709/230 |
| 6,609,225 B1 | 8/2003 | Ng | 714/781 |
| 6,629,141 B2 | 9/2003 | Elzur et al. | 709/224 |
| 6,658,480 B2 | 12/2003 | Boucher | 709/239 |
| 6,687,758 B2 | 2/2004 | Craft | 709/250 |
| 6,697,868 B2 | 2/2004 | Craft | 709/230 |
| 6,751,665 B2 | 6/2004 | Philbrick | 709/224 |
| 6,757,746 B2 | 6/2004 | Boucher | 709/250 |
| 6,807,581 B1 | 10/2004 | Starr | 709/250 |
| 6,938,092 B2 | 8/2005 | Burns | 709/230 |
| 6,941,386 B2 | 9/2005 | Craft | 709/250 |
| 6,965,941 B2 | 11/2005 | Boucher | 709/230 |
| 6,996,070 B2 * | 2/2006 | Starr et al. | 370/252 |
| 7,032,228 B1 * | 4/2006 | McGillis et al. | 719/321 |
| 7,042,898 B2 | 5/2006 | Blightman | 370/463 |
| 7,124,205 B2 * | 10/2006 | Craft et al. | 709/250 |
| 7,177,941 B2 * | 2/2007 | Biran et al. | 709/232 |
| 7,562,158 B2 * | 7/2009 | Shah et al. | 709/250 |
| 2001/0021949 A1 * | 9/2001 | Blightman et al. | 709/219 |
| 2001/0023460 A1 | 9/2001 | Boucher | 709/250 |
| 2001/0027496 A1 * | 10/2001 | Boucher et al. | 709/250 |
| 2001/0036196 A1 * | 11/2001 | Brightman | 370/465 |
| 2001/0037397 A1 * | 11/2001 | Boucher | 709/230 |
| 2001/0037406 A1 * | 11/2001 | Philbrick | 709/250 |
| 2001/0047433 A1 * | 11/2001 | Boucher et al. | 709/250 |
| 2002/0055993 A1 | 5/2002 | Shah et al. | 709/223 |
| 2002/0085562 A1 | 7/2002 | Hufferd et al. | 370/392 |
| 2002/0087732 A1 | 7/2002 | Boucher | 709/250 |
| 2002/0091844 A1 | 7/2002 | Craft | 709/230 |
| 2002/0095519 A1 | 7/2002 | Philbrick | 709/250 |
| 2002/0120899 A1 | 8/2002 | Gahan et al. | 714/748 |
| 2002/0147839 A1 * | 10/2002 | Boucher | 709/238 |
| 2002/0156927 A1 | 10/2002 | Boucher | 709/250 |
| 2002/0161919 A1 * | 10/2002 | Boucher | 709/238 |
| 2002/0163888 A1 | 11/2002 | Grinfeld | 370/235 |
| 2003/0005142 A1 | 1/2003 | Elzur et al. | 709/232 |
| 2003/0005143 A1 | 1/2003 | Elzur et al. | 709/232 |
| 2003/0014544 A1 | 1/2003 | Pettey | 709/249 |
| 2003/0016669 A1 | 1/2003 | Pfister et al. | 370/392 |
| 2003/0031172 A1 | 2/2003 | Grinfeld | 370/389 |
| 2003/0046330 A1 | 3/2003 | Hayes | 709/201 |
| 2003/0046418 A1 | 3/2003 | Raval et al. | 709/237 |
| 2003/0056009 A1 | 3/2003 | Mizrachi et al. | 709/245 |
| 2003/0058870 A1 | 3/2003 | Mizrachi et al. | 370/395.52 |
| 2003/0061505 A1 | 3/2003 | Sperry et al. | 713/200 |
| 2003/0066011 A1 | 4/2003 | Oren | 714/758 |
| 2003/0079033 A1 | 4/2003 | Craft | 709/230 |
| 2003/0084185 A1 | 5/2003 | Pinkerton | |
| 2003/0084212 A1 * | 5/2003 | Butterfield | 710/22 |
| 2003/0095567 A1 | 5/2003 | Lo et al. | 370/466 |
| 2003/0115350 A1 | 6/2003 | Uzrad-Nali et al. | 709/231 |
| 2003/0115417 A1 | 6/2003 | Corrigan | 711/118 |
| 2003/0128704 A1 | 7/2003 | Mizrachi et al. | 370/394 |
| 2003/0140124 A1 | 7/2003 | Burns | 709/220 |
| 2003/0145101 A1 | 7/2003 | Mitchell et al. | 709/236 |
| 2003/0145270 A1 | 7/2003 | Holt | 714/766 |

| | | | | |
|---|---|---|---|---|
| 2003/0163777 | A1* | 8/2003 | Holt | 714/763 |
| 2003/0167346 | A1 | 9/2003 | Craft | 709/250 |
| 2003/0177435 | A1* | 9/2003 | Budd et al. | 714/776 |
| 2003/0200284 | A1 | 10/2003 | Philbrick | 709/219 |
| 2004/0003126 | A1 | 1/2004 | Boucher | 709/250 |
| 2004/0037319 | A1* | 2/2004 | Pandya | 370/469 |
| 2004/0054813 | A1 | 3/2004 | Boucher | 709/250 |
| 2004/0062245 | A1* | 4/2004 | Sharp | 370/392 |
| 2004/0062246 | A1* | 4/2004 | Boucher | 370/392 |
| 2004/0064578 | A1* | 4/2004 | Boucher | 709/236 |
| 2004/0064589 | A1* | 4/2004 | Boucher | 709/250 |
| 2004/0064590 | A1* | 4/2004 | Starr | 709/250 |
| 2004/0073703 | A1* | 4/2004 | Boucher | 709/245 |
| 2004/0078462 | A1* | 4/2004 | Philbrick | 709/224 |
| 2004/0088262 | A1* | 5/2004 | Boucher | 705/65 |
| 2004/0100952 | A1* | 5/2004 | Boucher | 370/389 |
| 2004/0111535 | A1* | 6/2004 | Boucher | 709/250 |
| 2004/0117509 | A1* | 6/2004 | Craft | 709/250 |
| 2004/0158640 | A1* | 8/2004 | Philbrick | 709/230 |
| 2004/0158793 | A1* | 8/2004 | Blightman | 714/776 |
| 2004/0240435 | A1* | 12/2004 | Boucher | 370/352 |
| 2005/0122986 | A1* | 6/2005 | Starr | 370/412 |
| 2005/0141561 | A1* | 6/2005 | Craft | 370/474 |
| 2005/0143112 | A1* | 6/2005 | Jonsson | 455/522 |
| 2005/0149645 | A1* | 7/2005 | Tsuruta | 710/22 |
| 2005/0160139 | A1* | 7/2005 | Boucher | 709/203 |
| 2005/0175003 | A1* | 8/2005 | Craft | 370/389 |
| 2005/0182841 | A1* | 8/2005 | Sharp | 709/228 |
| 2005/0198198 | A1* | 9/2005 | Craft | 709/217 |
| 2005/0204058 | A1* | 9/2005 | Philbrick | 709/228 |
| 2005/0278459 | A1* | 12/2005 | Boucher | 709/250 |
| 2006/0009952 | A1* | 1/2006 | Anderson et al. | 702/194 |
| 2006/0010238 | A1* | 1/2006 | Craft | 709/227 |
| 2007/0062245 | A1 | 3/2007 | Fuller et al. | 72/413 |
| 2007/0206587 | A1* | 9/2007 | Ramaiah et al. | 370/389 |
| 2008/0253395 | A1* | 10/2008 | Pandya | 370/469 |

FOREIGN PATENT DOCUMENTS

| | | |
|---|---|---|
| AU | 7364898 | 11/1998 |
| AU | 4435999 | 12/1999 |
| AU | 723724 | 9/2000 |
| AU | 0070603 | 3/2001 |
| AU | 734115 | 6/2001 |
| AU | 0741089 | 11/2001 |
| AU | 0228874 | 5/2002 |
| CA | 2265692 | 5/1998 |
| CA | 2287413 | 11/1998 |
| CA | 2328829 | 12/1999 |
| CA | 2265692 C | 8/2001 |
| CN | 1237295 A | 12/1999 |
| CN | 1266512 T | 9/2000 |
| CN | 1305681 T | 7/2001 |
| TW | 447205 B | 7/2001 |
| TW | 448407 B | 8/2001 |
| WO | WO98/21655 | 5/1998 |
| WO | WO 98/50852 | 11/1998 |
| WO | WO 99/65219 | 12/1999 |
| WO | WO0013091 A1 * | 3/2000 |
| WO | WO0027519 * | 9/2000 |
| WO | WO 01/13583 | 2/2001 |
| WO | WO 01/28179 | 4/2001 |
| WO | WO02/27519 A1 | 4/2002 |
| WO | WO 02/39302 | 5/2002 |
| WO | WO 02/059757 | 8/2002 |
| WO | WO 02/086674 | 10/2002 |
| WO | WO 03/021443 | 3/2003 |
| WO | WO 03/021447 | 3/2003 |
| WO | WO 03/021452 | 3/2003 |
| WO | WO2005057945 * | 12/2003 |
| WO | WO 2005/057945 A2 | 6/2005 |
| WO | WO2005/057945 A3 | 6/2005 |

OTHER PUBLICATIONS

Yeh et al., "Introduction to TCP/IP Offload Engine (TOE)" 10 Gigabit Ethernet Alliance.
European Search Report from European Application No. 98959558 Completed on Nov. 10, 2005.
A.S. Tanenbaum, "Structured Computer Organization" 1990, Prentice-Hall International., US, XP002349956.
Muller, Raimund, LON-das universelle Netzwerk Elektronik 22-1991.
Abbot, Mark B.; Peterson, Larry L., "Increasing Network Trhoguhput by Integrating Protocol Layers" IEEE 1993.
Wright, Maury, Low-Cost Control LANs Add Automation to Homes, Autos, and Offices EDN-Technology Jul. 20, 1992.
Preston, David J., "Internet Protocols Migrate to Silicon for Networking Devices" Electronic Design Apr. 14, 1997.
Chesson, Greg, "The Protocol Engine Project" Technology Focus Sep. 1987.
Chesson, Greg, "Proceedings of the Summer 1987 USENIX Conference" USENIX Association Jun. 8-12, 1987.
G. Chesson and L. Green, "XTP Protocol Engine VLSI for Real-Time LANS" EFOC/LAN Jun. 29-Jul. 1, 1968.
Wayner, "Sun Gambles on Java Chops", Bytes, Nov. 1996.
Raz, "Real Time Program Language Accelerator", WO 98/21655, May 1998.
Agrawal et al. "Architecture and Design of the Mars Hardware Accelerator", ACM 1987, pp. 101-107.
Case, "Implementing the Java Virtual Machine", Microprocessor Report, Mar. 1996.
Kitadeya et al., "Matsushita Launches Web TV Internet Connection Terminal", http://www.mei.co.jp/corp/news/official.data/data.dir/en981112-1/en981112-1.html, Nov. 1998.
iReady Product Data Sheet, Internet Tuner.
Johnson et al. , "Internet Tuner", New Media News, http://www.newmedianews.com/020197/ts.sub- inettuner.html, Jan. 1997.
Kelly, T., "Cheap Internet Hardware that Fits in Everything", ZDNet, http://www.zdnet.co.uk/news/1998/44/ns-5998.html, Nov. 1998.
8802-3:2000 ISO/IEC Information Technology, http://www.computer.org/cspress/CATALOG/st01118.htm.
INCITS: Development work conducted in t10-I/O Interface-Lower Level Sep. 30, 2002 Weber, Ralph O.
Stevens, Richard W., "TCP/IP Illustrated Volume" Addison-Wesley Professional Computing Series.
Abbot, Mark B., and Peterson, Larry L., "Increasing Network Throughput by Integrating Protocol Layers" IEEE 1993.
Wright, Maury, "Low-Cost Control LANs Add Automation to Homes, Autos, and Offices" EDN Jul. 20, 1992.
Muller, Raimund, "LON—das universelle Netzwerk" Elektronik 22/1991.
Rang, Michael; Tantawy, Ahmed, "A Design Methodology for Protocol Processors" IEEE 1995.
Banks, David and Prudence, Michael, "A High-Performance Network Architecture for a PA-RISC Workstation" IEEE Journal vol. II, No. 22 Feb. 1993.
Steenkiste, Peter, "A High-Speed Network Interface for Distributed-Memory Systems: Architecture and Applications" ACM Transactions on Computer Systems, vol. 15, No. 1 Feb. 1997.
Doumenis, Gr.A., Konstantoulakis, G.E., Reisis, D.I.and Stassinopoulos, G.I. "A Personal Computer Hosted Terminal Adapter for the Broadband Integrated Services Digital Network and Applications" National Technical University of Athens, Greece.
Womack, Lucas; Mraz, Ronald; Mendelson, Abraham, "A Study of Virtual Memory MTU Reassembly withing the PowerPC Architecture" IEEE 1997.
Steenkiste, Peter, "A Systematic Approach to Host Interface Design for High-Speed Networks" IEEE Mar. 1994.
Wittie, Larry D., Ma, Fanyuan, "A TCP/IP Communication Subsystem in Micros" IEEE 1987.
Dalton, Chris; Watson, Greg; Banks, David; Calamvokis, Costas; Edwards, Aled; Lumley, John, "Afterburner: A Network-independent card provides architectural support for high-performance protocols" IEEE Jul. 1993.
Gupta, Pankaj; McKeown, Nick, "Algorithms for Packet Classification" IEEE Network Mar./Apr. 2001.
Clark, David D.; Romkey, John; Salwen, Howard, "An Analysis of TCP Processing Overhead" IEEE 1988.
Clark, David D.; Jacobson, Van; Romkey, John; Salwen, Howard, "An Analysis of TCP Processing Overhead" IEEE Jun. 1989.

Goloi, W.K.; Behr, P. "An IPC Protocol and Its Hardware Realization for a High-Speed Distributed Multicomputer System" IEEE 1981.
Ames, Richard, "Building an Embedded Web Server from Scratch" Circuit Cellar INK Feb. 1998.
Legg, John, "Choosing and implementing an embedded TCP/IP Stack" Electronic Product Design Jan. 1999.
Orphanos, George; Birbas, Alexios; Petrellis, Nikos; Mountzouris, Ioannis; Malataras, Andreas, "Compensating for Moderate Effective Throughput at the Desktop" IEEE Communication Magazine Apr. 2000.
Yocum, Kenneth G.; Chase, Jeffrey S.; Gallatin, Andrew J.; Lebeck, Alvin R., Cut-Through Delivery in Trapeze: An Exercise in Low-Latency Messaging IEEE 1997.
Varada, S.; Yang, Y.; Evans, D., "Data and Buffer Management in ATM Systems" TranSwitch Corporation.
Bonjour, Dominique; de Hauteclocque, Gaelle; le Moal, Jacques, "Design and Application of ATM LAN/WAN Adapters" IEEE 1998.
Kim, Chan; Jun, Jong-Jun; Park, Yeong-Ho; Lee, Kyu-Ho; Kim, Hyup-Jong, "Design and Implementation of a High-Speed ATM Host Interface Controller" Electronics and Telecommunications Research Institute, Korea.
Steenkiste, Peter, "Design, Implementation, and evaluation of a Single-copy Protocol Stack" Software—Practice and Experience, vol. 28, Jun. 1998.
Meleis, Hanafy E.; Serpanos, Dimitrios, N., "Designing Communication Subsystems for High-Speed Networks" IEEE Network Jul. 1992.
Doumenis, Gr. A.; Reisis, D.I.; Stassinopoulos, G.I., "Efficient Implementation of the SAR Sublayer and the ATM Layer in High-Speed Broadband ISDN Data Terminal Adapters" IEEE 1993.
Mora, F.; Sebastia, A., "Electronic Design of a High Performance Interfacce to the SCI Network" IEEE 1998.
Eady, Fred, "Embedded Internet Part 2: TCP/IP and a 16-Bit Compiler" Embedded PC Jun. 1999.
Shivam, Piyush; Wyckoff, Pete; Panda, Dhabaleswar, "EMP: Zero-copy OS-bypass NIC-driven Gigabit Ethernet" SC2001 Nov. 2001, Denver CO, USA.
Mansour, Mohammad; Kayssi, Ayman, "FPGA-Based Internet Protocol Version 6 Router" IEEE 1998.
Smith, Jonathon M.; Traw, C. Brendan S., "Giving Applications Access to Gb/s Networking" IEEE Network Jul. 1993.
Traw, C. Brendan S.; Smith, Jonathan M., "Hardware/Software Organization of a High-Performance ATM Host Interface" IEEE 1993.
Nagata, Takahiko; Hosoda, Yamashita, Hiroyuki, "High-Performance TCP/IP/ATM Communication Board" NTT Information and Communication Systems Laboratories 1998.
Nagata, Takahiko; Hosoda, Yasuhiro; Yamahsita, Hiroyuki, "High-Performance TCP/IP/ATM Communication Boards:Driving Force for Various Multimedia Services" vol. 9 No. 6 Nov. 1997.
Jolitz, William Frederick, "High-Speed Networking: Header prediction and forward-error correction for very high-speed data transfer" Dr. Dobbs Journal, Aug. 1992.
Chiswell, Dave "Implementation Challenges for 155Mbit ATM Adapters" ISBN#0-7803-2636-9.
Wright, Maury "Intelligent Ethernet Boards" EDN Jun. 23, 1988.
Preston, David "Intetnet Protocols Migrate to Silicon for Networking Devices" Electronic Design Apr. 14, 1997.
Ivanov-Loshkanov, V.S.; Sevast'yanov, S.F., Semenov, M.N., "Network Microprocessor Adapter" Avtmatika i Vyshislitel'naya Tekhnika vol. 17 No. 5 pp. 25-28, 1983.
Druschel, Peter; Abbot, Mark B.; Pagels, Michael A.; Peterson, Larry L., "Network Subsystem Design" IEEE Network Jul. 1993.

Huange, Jau-Hsiung; Chen, Chi-Wen, "On Performance Measurments of TCP/IP and its Device Driver" IEEE 1992.
Siegel, Martin; Williams, Mark; Robler, Georg, "Overcoming Bottlenecks in High-Speed Transport Systems" IEEE 1991.
Neufeld, Gerald W.; Ito, Mabo Robert; Goldberg, Murray; McCutcheon, Mark J.; Ritchie, Stuart, "Paralleel Host Interface for an ATM Network" IEEE Network Jul. 1993.
Maly, K.; Khanna, K.; Kukkamala, R.; Overstreet C.M.; Yerraballi, R.; Foundriat, E.C.; Madan, B., "Parallel TCP/IP for Multiprocessor Workstations" High Performance Networking, IV, 1993 IFIP.
Laskman, T.V.; Madhow, U., "Performance Analysis of Window-based Flow Control using TCP/IP:Effect of High Bandwidth Delay Products and Random Loss" High Performance Networking V. 1994 IFIP.
Ramakrishnan, K.K., "Performance Considerations in Designing Network Interfaces" IEEE Journal1993.
Camarda, P.; Pipio, F.; Piscitelli, G.; "Performance evaluating of TCP/IP implementations in end systems" IEE Proc-Computer Digital Tech. vol. 146 No. 1 Jan. 1999.
Toyoshima, Kan; Shirakawa, Kazuhiro; Hayashi, Kazuhiro, "Programmable ATM Adapter: Rapid Prototyping of Cell Processing Equipment for ATM Network" IEEE 1997.
Blumrich, Matthias A.; Dubnicku, Cezary; Felton, Edward W.; Li, Kai, "Protected, User-level DMA for the SHRIMP Network Interface" IEEE 1996.
Feldmeier, David C.; McAuley, Anthony J.; Smith, Jonathan M., Bakin, Deborah S.; Marcus, William S.; Raleigh, Thomas M., "Protocol Boosters" IEEE 1998.
Marcus, William S.; Hadzic, Ilija; McAuley, Anthony J.; Smith, Jonathan M., "Protocol Boosters: Applying Programmability to Network Infrastructures" IEEE Communications Magazine Oct. 1998.
Korablum, Deborah F., "Protocol Implementation and Other Performance Issues for Local and Metropolitan Area Networks" EEE 1988.
Dittia, Zubin D.; Parulkar, Guru M.; Jr., Jerome R. Cox, "The APIC Approach to High Performance Network Interface Design: Protect4ed DMA and Other Techniques" IEEE 1997.
Rutsche, Erich, "The Architecture of a Gb/s Multimedia Protocol Adapter" ACM SIGCOMM Computer Communication Review.
Moldeklev, Kjersti; Klovning, Espen; Kure, Oivind, "The effect of end system hardware and software on TCP/IP throughput performance over a local ATM Network".
Kanakia, Hermant; Cheriton, David R., "The VMP Network Adapter Board (NAB) High Performance Network Communication for Multiprocessors" ACM 1988.
Chandrammenon, Grish P.; Varghese, George, "Trading Packet Headers for Packet Processing" IEEE 1996.
Nielson, Dr. Michael J.K., "TURBOchannel" IEEE 1991.
New Media News, www.newmedianews.com/02197/ts_inettuner.html.
Kelly, T. "Cheap Internet Hardware that Fits in Everything" ZDNet, www.zdnet.co.uk/news/1998/77/ns-5998.html, Year 1998.
Kitadeya et al. "Matsushita Launches WebTV Internet Connection Terminal" www.mei.co.jp/corp/news/official.data.dir/en981112-1/en981112-1html.
eady Product Data Sheet, Internet Tuner.
Luijten, Ronald P., "An OC-12 ATM Switch Adapter Chipset" 1998 IEEE.
"Less-Numerical Algorithms", Ch. 20 p. 888-895.
"Storage Networking Industry Association" iSCSI Building Blocks for IP Storage Networking, www.ipstorage.org.

* cited by examiner

SYSTEM AND METHOD FOR USING METADATA IN THE CONTEXT OF A TRANSPORT OFFLOAD ENGINE

FIELD OF THE INVENTION

The present invention relates to transport offload engines, and more particularly to managing network communications utilizing transport offload engines.

BACKGROUND OF THE INVENTION

Transport offload engines (TOE) include technology that is gaining popularity in high-speed systems for the purpose of optimizing throughput, and lowering processor utilization. TOE components are often incorporated into one of various printed circuit boards, such as a network interface card (NIC), a host bus adapter (HBA), a motherboard; or in any other desired offloading context.

In recent years, the communication speed in systems has increased faster than processor speed. This has produced an input/output (I/O) bottleneck. The processor, which is designed primarily for computing and not for I/O, cannot typically keep up with the data units flowing through the network. As a result, the data flow is processed at a rate slower than the speed of the network. TOE technology solves this problem by removing the burden (i.e. offloading) from the processor and/or I/O subsystem.

Prior art FIG. 1 illustrates a system 100 including both a host processor 102 and a transport offload engine 104, in accordance with the prior art. In use, the processor 102 generates data lists 106 [i.e. scatter-gather lists (SGLs), etc.] for identifying a location in memory 110 where data resides which is to be communicated via a network 116. As shown, the data lists 106 include an address where the data may be found, as well as an associated length.

In use, the processor 102 transmits the data lists 106 to the transport offload engine 104. Armed with such data lists 106, the transport offload engine 104 retrieves the data from the memory 110 and stores the same in a buffer 112, where the data waits to be communicated via the network 116.

To track the various network connections or sockets over which the data is communicated via the network 116, the transport offload engine 104 further employs control blocks 114, which may each include various information associated with a particular network connection or socket.

Thus, to receive a large amount of data via the network 116, the memory required to store data lists 106 and control blocks 114 as well as the buffer 112 may become excessively large. Unfortunately, a large memory can not be implemented in a cost-effective manner on an integrated-circuit transport offload engine 104, since integrating on-board memory on the transport offload engine 104 is costly in terms of silicon die area, for example.

There is thus a need for a more cost effective-technique for transmitting data in a network using data lists (SGLs, etc.).

SUMMARY OF THE INVENTION

A system, method and related data structure are provided for communicating data in a network. Included is a data object (i.e. metadata) for communicating between a first network protocol layer and a second network protocol layer. In use, the data object facilitates network communication management utilizing a transport offload engine.

In one embodiment, the first network protocol layer may include a transport protocol layer. Moreover, the second network protocol layer may include a layer above the transport protocol layer. Optionally, the second network protocol layer may include an application, for example small computer system interface (SCSI) protocol, an Internet small computer system interface (iSCSI) protocol, etc. Of course, the data object may be used in the context of any desired network protocol layer(s).

In another embodiment, the data object may be communicated between a processor and the transport offload engine. Furthermore, the data object may be stored with a data list [i.e. a scatter-gather list (SGL), a memory-descriptor list (MDL), etc.]. Such data list may include an address in memory where data to be communicated is stored, along with any other desired information to facilitate the transmission of the data in a network.

As a further option, the processor may communicate an instruction message to the transport offload engine (TOE) identifying a location in memory where the data list and the data object are stored. Alternatively, the processor may communicate to the TOE a count of how many WORDs have been added to the data list for processing. Still yet, an indicator (i.e. a bit, etc.) may be used to distinguish between the data list elements and the data object elements.

Generally speaking, the data object may be used to communicate state information associated with the second network protocol layer to the first network protocol layer, where the first network protocol layer resides below the second network protocol layer. Further, the data object may be used to communicate (i.e. feedback, etc.) state information associated with the first network protocol layer to the second network protocol layer.

In one embodiment, the data object may include a byte indicator for indicating a number of bytes until a subsequent protocol data unit (PDU). By this feature, markers may be inserted into a data stream in which data is communicated utilizing the transport offload engine for communicating the number of bytes until the subsequent PDU, and/or for communicating an occurrence of a previous PDU.

In another aspect of the present embodiment, the data object may include a start indicator, where the start indicator is adapted for indicating a start of a PDU. Still yet, the data object may include an end indicator for indicating an end of a PDU.

In still another embodiment, the data object may include a transmission control protocol urgent (TCP URG) indicator. In use, such TCP URG indicator may be adapted for indicating a number of bytes until a TCP URG section is complete.

In still another particular embodiment, the data object may include a cyclic redundancy check (CRC) indicator, or another integrity indicator. In use, the CRC indicator may be adapted for clearing a CRC of a socket to zero. Moreover, the CRC indicator may prompt calculation of a CRC, and transmission of the CRC with data communicated in a network. Still yet, the CRC indicator may prompt transmission of a status message to a processor that includes the CRC, where the CRC is stored by the processor in response to the status message for being used during a retransmission request (thus avoiding the need for recalculation).

Thus, the transport offload engine may utilize the data object to process data associated with an upper network protocol layer. Such processed data may then be inserted into a data stream in which the data is communicated utilizing the transport offload engine. The processed data may further be fed back to the processor for use during retransmission. To this end, processing may be offloaded from a processor to the transport offload engine. Moreover, the data may optionally be transmitted between the processor and the transport offload engine only once to conserve resources.

BRIEF DESCRIPTION OF THE DRAWINGS

Prior art

DETAILED DESCRIPTION

Figure 1:
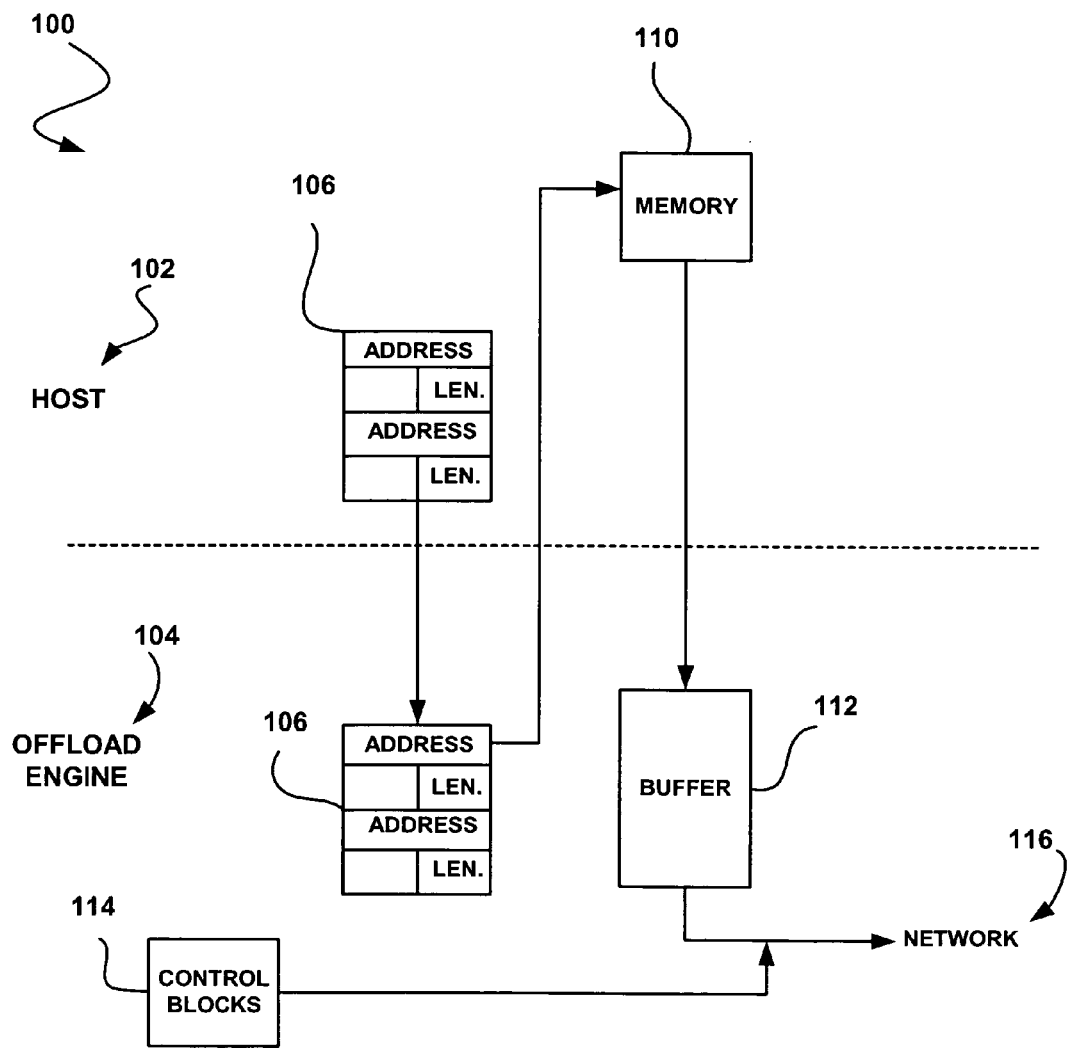
FIG. 1 illustrates a system including both a processor and a transport offload engine, in accordance with the prior art.
Figure 2:
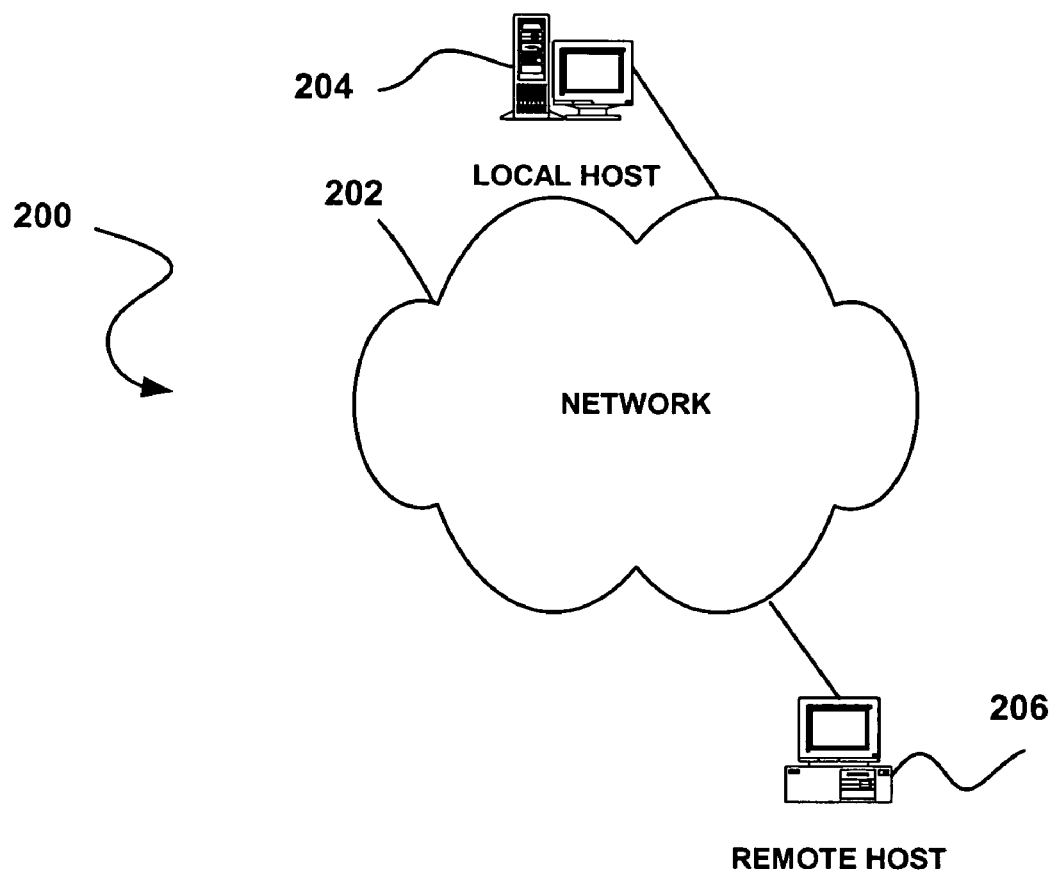
FIG. 2 illustrates a network system, in accordance with one embodiment.

FIG. 2 illustrates a network system 200, in accordance with one embodiment. As shown, a network 202 is provided. In the context of the present network system 200, the network 202 may take any form including, but not limited to a local area network (LAN), a wide area network (WAN) such as the Internet, etc.

Coupled to the network 202 are a local host 204 and a remote host 206 which are capable of communicating over the network 202. In the context of the present description, such hosts 204, 206 may include a web server, storage server or device, desktop computer, lap-top computer, hand-held computer, printer or any other type of hardware/software. It should be noted that each of the foregoing components as well as any other unillustrated devices may be interconnected by way of one or more networks.

Figure 3:
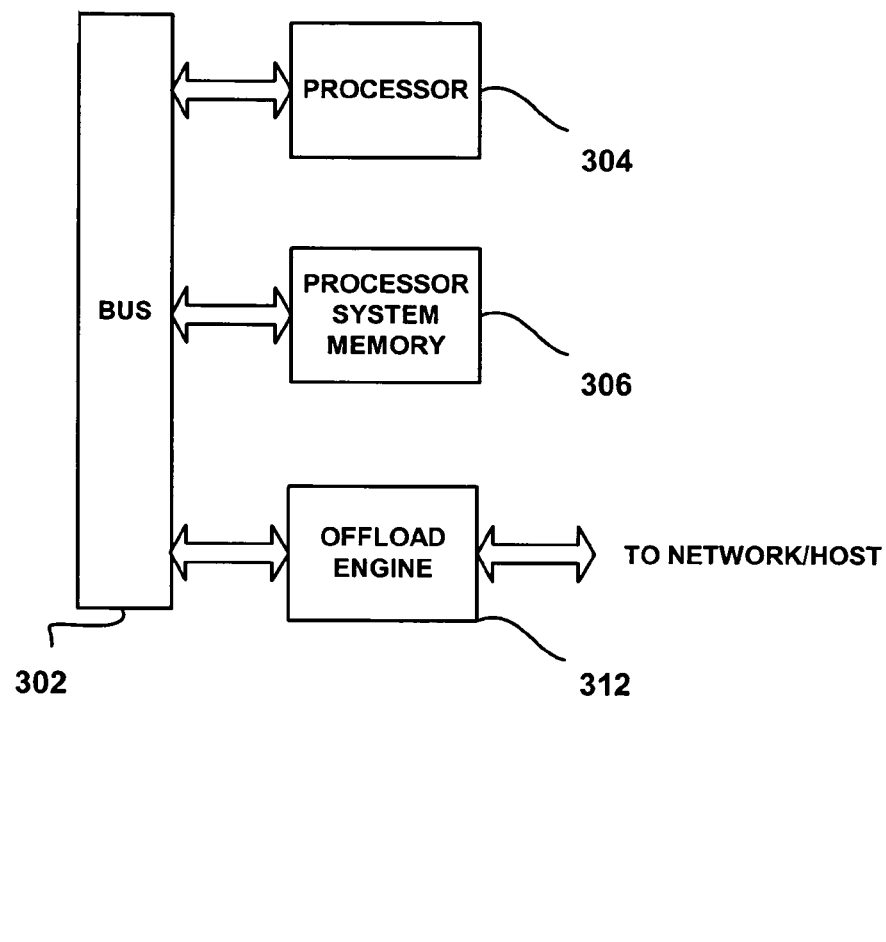
FIG. 3 illustrates an exemplary architecture in which one embodiment may be implemented.

FIG. 3 illustrates an exemplary architecture 300 in which one embodiment may be implemented. In one embodiment, the architecture 300 may represent one of the hosts 204, 206 of FIG. 2. Of course, however, it should be noted that the architecture 300 may be implemented in any desired context.

For example, the architecture 300 may be implemented in the context of a general computer system, a circuit board system, a game console system dedicated for entertainment purposes, a set-top box, a router, a network system, a storage system, an application-specific system, or any other desired system associated with the network 202.

As shown, the architecture 300 includes a plurality of components coupled via a bus 302. Included is at least one processor 304 for processing data. While the processor 304 may take any form, it may, in one embodiment, take the form of a central processing unit (CPU), a chipset (i.e. a group of integrated circuits designed to work and sold as a unit for performing related functions, etc.), or any other desired processing device(s) capable of processing data.

Further included is processor system memory 306 (e.g. a tangible computer readable medium, etc.) which resides in communication with the processor 304 for storing the data. Such processor system memory 306 may take the form of on or off-board random access memory (RAM), a hard disk drive, a removable storage drive (i.e., a floppy disk drive, a magnetic tape drive, a compact disk drive, etc.), and/or any other type of desired memory capable of storing the data.

In use, programs, or control logic algorithms, may optionally be stored in the processor system memory 306. Such programs, when executed, enable the architecture 300 to perform various functions. Of course, the architecture 300 may simply be hardwired.

Further shown is a transport offload engine 312 in communication with the processor 304 and the network (see, for example, network 202 of FIG. 2). In one embodiment, the transport offload engine 312 may remain in communication with the processor 304 via the bus 302. Of course, however, the transport offload engine 312 may remain in communication with the processor 304 via any mechanism that provides communication therebetween. The transport offload engine 312 may include a transport (i.e. TCP/IP) offload engine (TOE), or any integrated circuit(s) that is capable of managing the data communicated in the network.

During operation, in order to provide a cost-effective technique for communicating data in the network, the transport offload engine 312 employs a data object for communicating between a first network protocol layer and a second network protocol layer. More exemplary information regarding one illustrative embodiment of such data object will now be set forth.

Figure 3A:
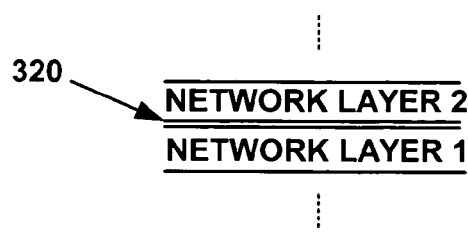
FIG. 3A illustrates a data object for facilitating network communication management in the context of a transport offload engine, in accordance with one embodiment.

FIG. 3A illustrates a data object 320 for facilitating network communication management in the context of a transport offload engine, in accordance with one embodiment. As shown, the data object 320 is for communicating above a first network protocol layer and below a second network protocol layer.

In one embodiment, the first network protocol layer may include a transport protocol layer. Moreover, the second network protocol layer may include any layer above the transport protocol layer. Optionally, the second network protocol layer may, for example, include a small computer system interface (SCSI) protocol, an Internet small computer system interface (iSCSI) protocol; a remote direct memory access (RDMA) protocol, a direct data placement (DDP) protocol, a markers with protocol data unit (PDU) alignment (MPA) protocol, a network file system (NFS) protocol, etc. It should be noted, however, that the data object may be positioned between any desired network protocol layers including, but certainly not limited to SCSI, iSCSI, RDMA, DDP, TCP, IP, etc.

In use, the data object serves to facilitate network communication management utilizing the transport offload engine 312. While such facilitation may take any form that improves operation (i.e. requires less, if any, memory size or utilization on the transport offload engine 312, etc.), more information will now be set forth regarding an optional, illustrative method by which the transport offload engine 312 utilizes the data object.

Figure 4A:
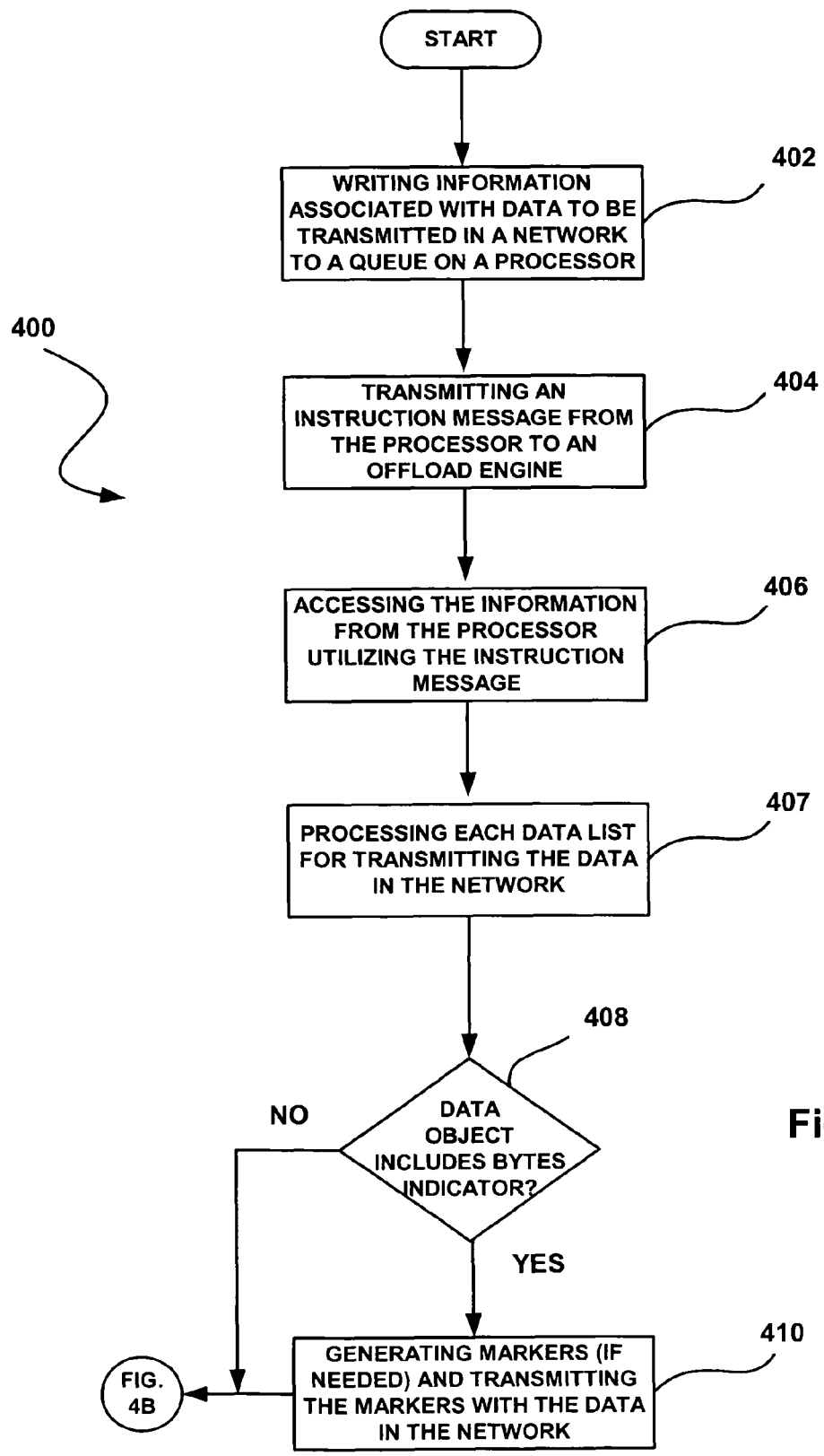
FIG. 4A illustrates an exemplary method for communicating data in a network, in accordance with one embodiment.
Figure 4B:
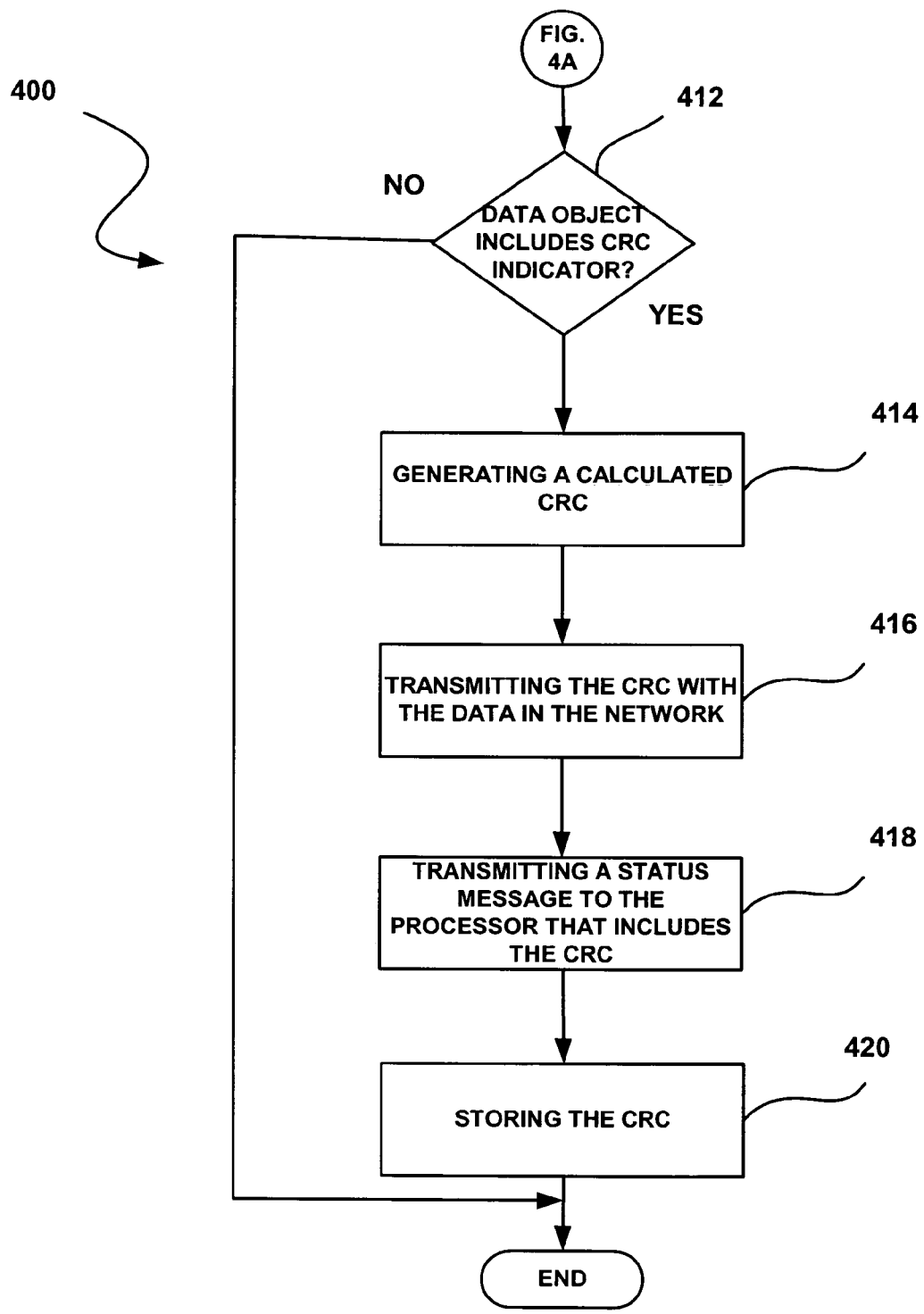
FIG. 4B illustrates a continuation of the method of FIG. 4A.

FIGS. 4A and 4B illustrate an exemplary method 400 for communicating data in a network, in accordance with one embodiment. As an option, the method 400 may be carried out in the context of the exemplary architecture 300 of FIG. 3. Of course, however, it should be noted that the method 400 may be implemented in any desired context. Moreover, while various functions may be attributed to exemplary components (i.e. like those set forth hereinabove), it is important to understand that the various functionality may be carried out by any desired entity.

As shown, in operation 402, information associated with data to be communicated in a network (see, for example, network 202 of FIG. 2) is written to a queue, utilizing a processor (see, for example, processor 304 of FIG. 3). Such queue may be stored in any desired memory (see, for example, memory 306 of FIG. 3; memory associated with transport offload engine 312; etc.). Moreover, the aforementioned information may include a data list [i.e. scatter-gather list (SGL), memory descriptor list (MDL), etc.] which may include at least one data object. As an option, the data object may take the form of metadata.

As a further option, a plurality of the queues may be provided, one for each network socket, or connection. Moreover, a control block may be provided to track the transmission of data via the various sockets. More exemplary information regarding such queues and control blocks will be provided during reference to FIG. 5.

In the context of the present description, the aforementioned data list may include at least one address in memory where data to be communicated is stored, a length of the data, and/or any other desired information to facilitate the retrieval, management, etc. of data for the communication thereof in the network. Still yet, the data object may include any information capable of facilitating network communication management utilizing the transport offload engine.

For example, the data object may include a byte indicator for indicating a number of bytes until a subsequent protocol data unit (PDU), if marking is to be supported. By this feature, markers may be inserted into a data stream in which data is communicated utilizing the transport offload engine for communicating the number of bytes until the subsequent PDU and/or for communicating an occurrence of a previous PDU, in the manner that will be set forth hereinafter in greater detail.

Still yet, as an option, the data object may include a cyclic redundancy check (CRC) indicator (or any another integrity indicator), when CRC is desired. In the context of the present description, CRC involves a technique of checking for errors in data that has been communicated in a network. To accomplish this check, the transport offload engine typically applies a 16- or 32-bit polynomial to a block of the data that is to be communicated and appends the resulting calculated (CRC) to the block. The receiving transport offload engine/host then applies the same polynomial to the data and compares the result with the result appended by the sending transport offload engine. If they match, the data has been received successfully. If not, the sending transport offload engine can be notified to resend the block of data.

As mentioned earlier, other forms of data integrity checks (also known as digests) may be used. Further, checks may cover both the header portions as well as data portions separately (i.e. one check for one portion of a PDU, another check for a different portion of a PDU, etc.).

Thus, in use, the CRC indicator may be adapted for clearing a CRC of a socket in the control block to zero, as well as prompt the various foregoing operations. Still yet, the CRC indicator may prompt the storage of the CRC at a location in memory indicated by the CRC indicator, to avoid the need for recalculation during retransmission, in the manner that will soon be set forth.

Thus, in more general terms, the data object may be used to communicate state information associated with the second network protocol layer to the first network protocol layer, where the first network protocol layer resides below the second network protocol layer. Further, the data object may be used to communicate (i.e. feedback, etc.) state information associated with the first network protocol layer to the second network protocol layer. More information regarding one exemplary embodiment of a data list/data object, and the manner in which such entities are stored in the queues will be set forth during reference to FIGS. 6 and 7.

To distinguish between the data list elements and data object elements in the queues, an indicator may be provided for determining whether the information is to be processed as a data list element or a data object element. Such indicator may take any form including, but not limited to a bit, etc.

Subsequently, in operation 404, an instruction message is communicated from the processor to the transport offload engine to provide the information necessary to access the information (i.e. data lists, data objects, etc.) queued in operation 402. In one embodiment, the instruction message may take the form of an instruction block (IB) that may include any desired information necessary to allow the transport offload engine to retrieve the data to be communicated. For example, the IB may indicate the number of data elements to be communicated, etc.

Equipped with the instruction message of operation 404, the transport offload engine may subsequently access the information stored by the processor. Note operation 406. As an option, direct memory access (DMA) operations may be used to access the information. Moreover, the information may be maintained by the processor until receipt of the transmitted data has been acknowledged. Once acknowledged, a status message may be transmitted from the transport offload engine to the processor for indicating which information may be disposed of, or overwritten. As an option, such status message may include a number of bytes that may be released.

With the information accessed, each data list may be processed by accessing the data to be transmitted and segmenting the data, as indicated in operation 407. Such segmented data may then be transmitted in the network. Any different/supplemental processing may be based on the content, if any, of the data object.

For example, if the data object includes the aforementioned byte indicator (see decision 408) and marking is desired, markers may be generated and transmitted with the data in the network. Note operation 410. Such markers may be utilized to facilitate network communication management by informing receiving hosts as to when a subsequent PDU can be expected, and/or an occurrence of a previous PDU. More exemplary information regarding such markers will be set forth in greater detail during reference to FIG. 8.

With reference now to FIG. 4B, if the data object includes the foregoing CRC indicator (see decision 412), various operations may take place. For example, a CRC may be calculated by applying the polynomial in the manner set forth hereinabove. Note operation 414. Such CRC may then be transmitted with the data in the network, as indicated in operation 416.

Still yet, the CRC indicator may prompt transmission of a status message to a processor that includes the CRC, where the CRC is stored by the processor in response to the status message. See operations 418-420. To this end, the stored CRC may be used during a retransmission request without recalculation, thus facilitating network communication management.

Thus, the transport offload engine may utilize the data object to process (i.e. calculate, etc.) data associated with an upper one of the network protocol layers. Such processed data may then be inserted into a data stream in which the data is communicated utilizing the transport offload engine. The processed data may further be fed back to a processor for retransmission purposes. To this end, processing may be offloaded from a processor. In other words, processing may be split between a software driver and the transport offload engine. Moreover, the data may optionally be transmitted between the processor and the transport offload engine only once, thus optionally freeing up resources on the transport offload engine.

Specifically, upon the transport offload engine detecting that a retransmission is required, the transport offload engine informs the processor with a retransmission status message, or retransmission requested status block (RRSB). The retransmission status message may contain a sequence number of the requested retransmission and length of the data requested. If the length of the data requested is zero, it may be assumed that the transport offload engine does not know how much data has been lost. In most cases, if a selective acknowledgement SACK feature is enabled, the transport offload engine may know how much data is to be retransmitted.

When the host processor receives the retransmission status message, a retransmission instruction message, or retransmission instruction block (IB), is generated. The retransmission instruction message may contain the sequence number that was passed by the retransmission status message and a series of data list (i.e. SGL) elements that are copied from a queue that is associated with the specified socket. These data list elements may contain the same data object(s) (i.e. metadata, etc.) as placed in the queue beforehand.

If markers are used with the socket connection, the first element in the data list may be a byte indicator data object specifying the number of bytes until the next PDU. The data list elements that are CRC data list entries may have CRC flags masked off as the transport offload engine need not necessarily know about CRCs during retransmission and may send the previously stored value. Alternatively, the transmit logic in the offload engine may ignore the CRC flags when encountered during retransmissions.

On reception of the retransmission instruction message, the transport offload engine may transmit a segment or a series of segments to service the instruction message. No status message need necessarily be generated when this retransmission instruction message has been completed. Freeing up of the elements on the queue may be handled when ACKs that come in from the TCP peer host acknowledges the data.

Between the time that the retransmission status message was transmitted to the host and the retransmission instruction message was sent to the transport offload engine, an ACK in the TCP stream may have acknowledged the data that was requested. The transport offload engine may check for this case by comparing the sequence number included in the retransmission instruction message with a received ACK number stored in a control block associated with the socket connection for the retransmitted data. The results of the comparison are used to determine if the data should still be retransmitted.

Figure 5:
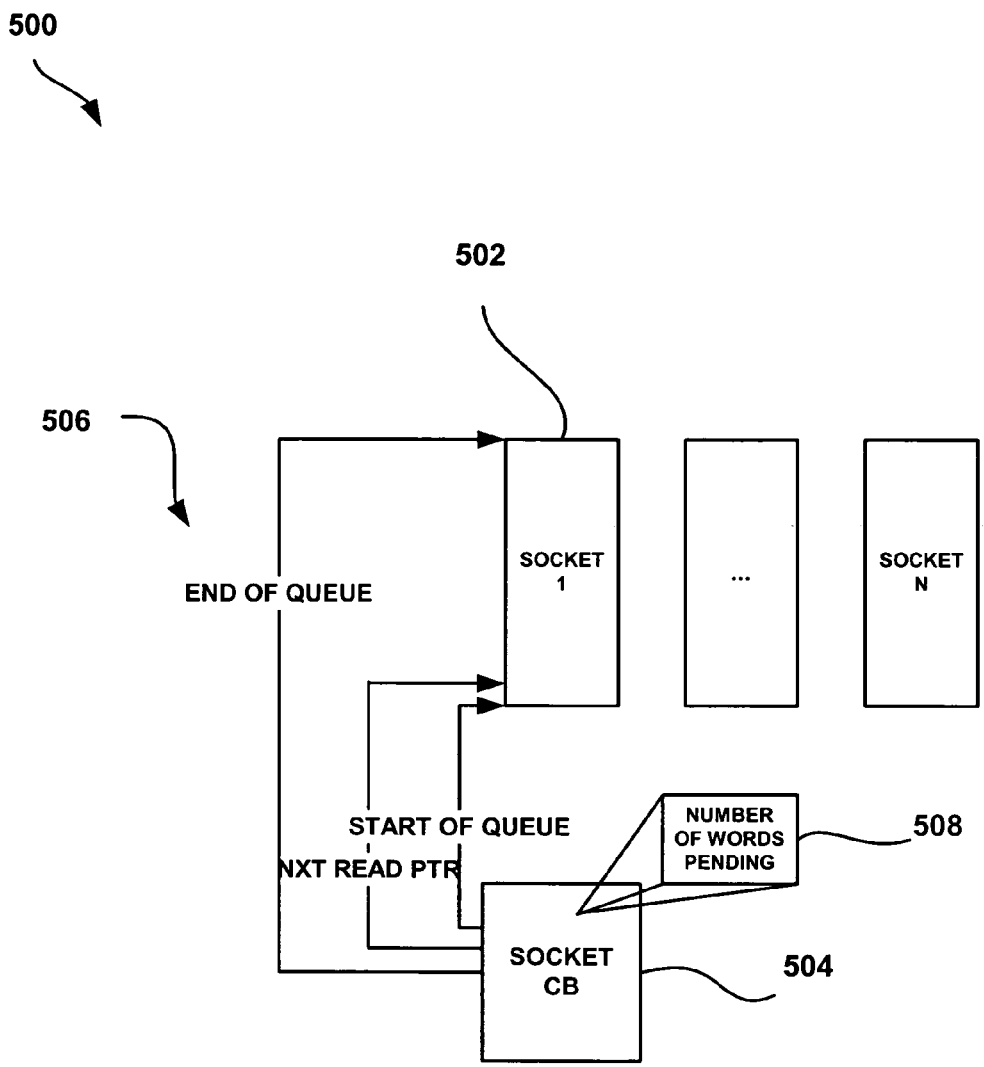
FIG. 5 illustrates exemplary queues and a control block system for communicating data in a network, in accordance with one embodiment.

FIG. 5 illustrates exemplary queues and a control block system 500 for transmitting data in a network, in accordance with one embodiment. As an option, the system 500 may be used in the context of the disclosure of the previous figures. Of course, however, it should be noted that the system 500 may be implemented in any desired context. Most importantly, the exemplary system 500 is set forth for illustrative purposes only, and should not be considered as limiting in any manner.

As shown, a plurality of queues 502 is provided on a processor (see, for example, processor 304 of FIG. 3), each for a separate socket, or network connection. Further provided is a control block 504 on a transport offload engine (see, for example, transport offload engine 312 of FIG. 3) adapted for tracking and managing the communication of data in a network, using the sockets. To accomplish this, the control block 504 receives information via an instruction message that is transmitted from the processor to the transport offload engine to provide the instrumentality necessary to access the queues 502 and the related data lists, data objects, etc. queued in operation 402 of FIG. 4.

Specifically, the control block 504 is capable of indicating a start of a queue 502, an end of the queue 502, and a next read pointer for indicating a next element of queued information to read. See 506. To further facilitate tracking information to be processed, a number of words pending to be read 508 may be tracked utilizing the control block 504. As an option, the words pending to be read 508 may be incremented upon receipt of an instruction block from the processor.

Figure 6:
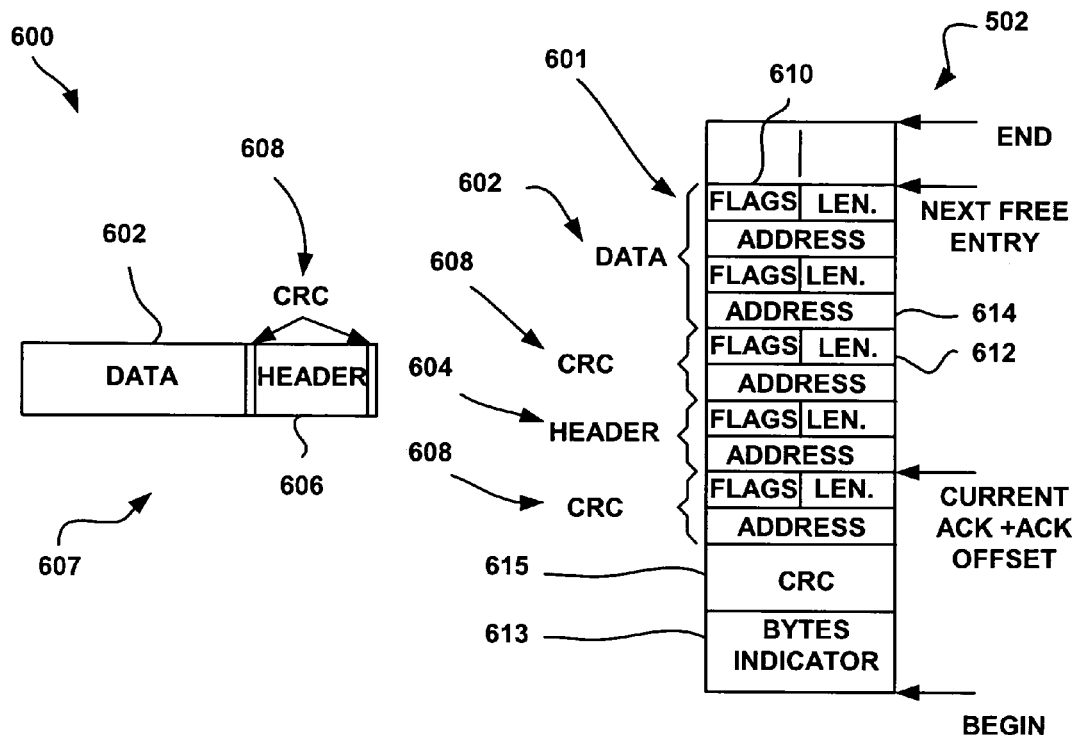
FIG. 6 illustrates a more detailed view of the contents of the queues of the system of FIG. 5, in accordance with one embodiment.

FIG. 6 illustrates a more detailed design 600 of the contents of the queues 502 of the system 500 of FIG. 5, in accordance with one embodiment. Again, the design 600 may be used in the context of the disclosure of the previous figures, or implemented in any desired context.

As shown, each data list 601 may be equipped with an address 614 pointing to a location in memory where the data to be transmitted is stored. Further provided is a length 612 associated with the data. Still yet, a flag field 610 is provided to identify the type of data list entry. As an example, at least one flag is included indicating whether the data is to include a cyclic redundancy check (CRC). As an option, various other flags may be provided, as desired.

In use, each data list 601 (i.e. SGL, etc.) may correspond with a portion of a PDU 607, or marker. For example, each data list 601 may point to a location in memory where data 602 or a header 606 of the PDU 607 is stored. Of course, multiple data lists 601 may correspond to a single portion (i.e. data 602, etc.) of the PDU 607. If multiple data lists 601 are to correspond to a single header 604 of the PDU 607, a CRC 608 may be positioned between the data 602 and header 606 portions of the PDU 607, in the following manner.

Interleaved among the data 602 and header 606 portions of the PDUs 607 may be CRCs 608. Such CRCs 608 may include a data object (see, for example, CRC indicator 615). Moreover, in the case where the CRC 608 precedes a header 606, the CRCs 608 may a data list 601 associated therewith for pointing to the appropriate location in memory where the calculated CRC 608 may be stored. In one embodiment, the data list 601 associated with a CRC 608 may point to a 4-byte data segment and include a dump CRC bit. Of course, the CRC 608 may follow the data 602 and header 606 portions of the PDUs 607, or be positioned in any desired manner.

It should be further noted that the CRCs 608 may be positioned adjacent to the data 602 and/or header 606 portions of the PDUs 607 to provide cyclic redundancy checks associated therewith. As mentioned earlier, the stored CRCs 608 may be used during a retransmission request without recalculation. Thus, since the CRC 608 does not need to be recalculated in such a situation, cyclic redundancy checks may require less processing during retransmission, as set forth earlier during reference to FIGS. 4A and 4B.

Still yet, a byte indicator 613 may precede the PDUs 607 in order to indicate a number of bytes until a subsequent PDU (and/or to indicate an occurrence of a previous PDU) for marking purposes. Given such byte indicator 613 along with a current TCP sequence number, the transport offload engine may set a next PDU pointer to point to a subsequent PDU.

Figure 8:
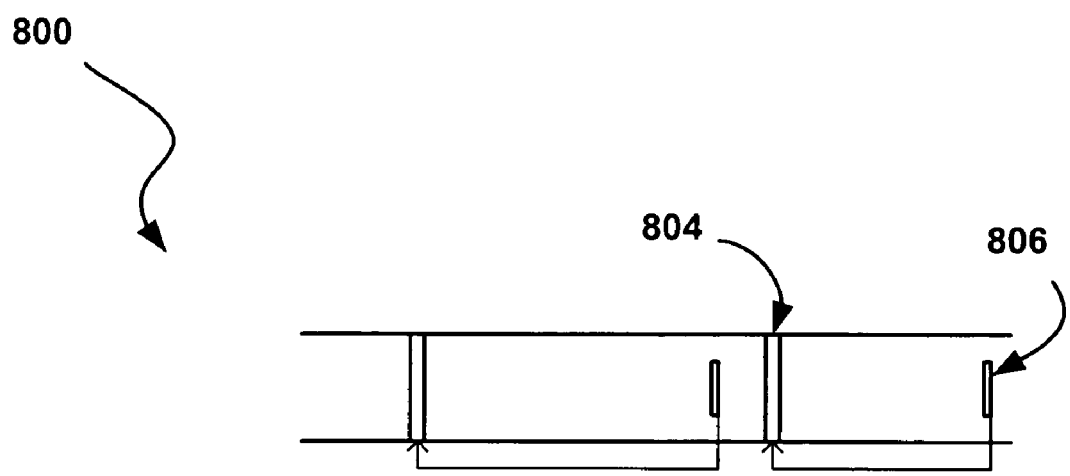
FIG. 8 illustrates an exemplary data stream including markers, in accordance with one embodiment.

More information regarding the manner in which markers are inserted within a data stream will be set forth in greater detail during reference to FIG. 8.

As an option, the data object may further include a start indicator (not specifically shown), where the start indicator is adapted for indicating a start of a PDU. Still yet, the data object may include an end indicator (not specifically shown) for indicating an end of a PDU. This may allow the queuing of many PDUs to be processed when the start and end of such PDUs need to be determined in an arbitrary list of data pointers.

In still another embodiment, the data object may include a transmission control protocol urgent (TCP URG) indicator (not specifically shown). In use, such TCP URG indicator may be adapted for indicating a number of bytes until a TCP URG section is complete. By this feature, TCP URG sections are not lost on retransmit, as happens on many modern day TCP stacks.

As further shown in FIG. 6, pointers may be used to track the status of processing of the queue 502 of data lists 601 and data objects 613, 615. For example, in addition to the start, end and next pointer mentioned in FIG. 5, an acknowledgment (ACK) pointer may be included for identifying which portion of the queue no longer needs to be stored (since the corresponding data has been successfully sent), as indicated by the transport offload engine status message mentioned earlier.

In an embodiment specific to an implementation in the context of an iSCSI protocol, a PDU pointer may also be included to indicate a beginning of a PDU. Such PDU pointer may be updated once the aforementioned ACK pointer moves onto a subsequent PDU.

Figure 7:
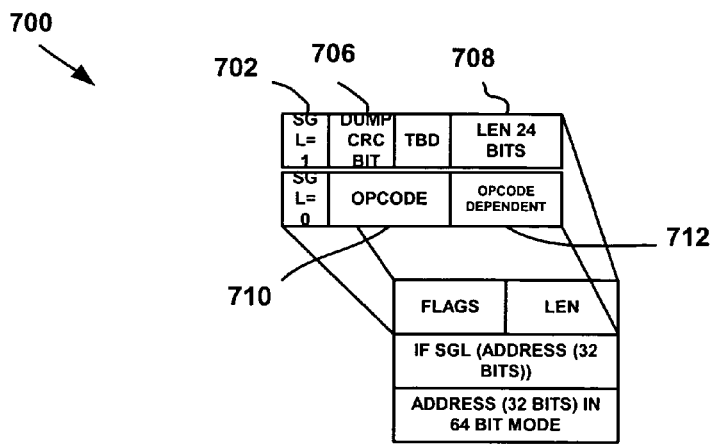
FIG. 7 illustrates an exemplary configuration of the contents of the queue of FIG. 6, in accordance with one embodiment.

FIG. 7 illustrates a more detailed, exemplary design 700 of the contents of the queue of FIG. 6, in accordance with one embodiment. Again, the design 700 may be used in the context of the disclosure of the previous figures, or implemented in any desired context.

As shown, the portion of each data list 601 including the flags 610 and length 612 of FIG. 6 may take various forms. A first bit 702 indicates whether the associated information should be processed as a data list or a data object (i.e. metadata, etc.). Moreover, in the case where the first bit 702 indicates that the information should be processed as a data list, a second bit 706 operates as a CRC indicator for indicating that the particular data list should not be processed normally, but instead used to clear a CRC of a socket to zero and store a calculated CRC, as set forth hereinabove. Further included are length bits 708, as well as available bits for additional design options.

On the other hand, in the case where the first bit 702 indicates that the information should be processed as a data object, various operation code 710 and further opcode dependent data 712 are provided for facilitating network communication management.

FIG. 8 illustrates an exemplary data stream 800 including the markers mentioned during reference to FIGS. 4A and 4B, in accordance with one embodiment. Again, the exemplary data stream 800 may be used in the context of the disclosure of the previous figures, or implemented in any desired context.

As shown, markers 806 may be inserted by the transport offload engine (see, for example, transport offload engine 312, of FIG. 3) in the context of the transport network protocol layer. Such markers 806 may be used by a receiving remote host (see, for example, remote host 206 of FIG. 2) for identifying the start (location of headers 804) of PDUs in the data stream 800. To accomplish this, the markers 806 may be inserted in the data stream 800 at fixed intervals.

To support markers 806 at a receiving host, such host may be programmed with two values, a mask and offset. As an option, the markers may be supported for intervals that are powers of two. The host may know what the starting sequence number was at the beginning of the connection and when marker support needs to be turned on. The transport offload engine may be supplied with the mask, where the mask is the marker interval. For example, a mask of 0xff may be a marker interval of 256 bytes and a mask of 0x7ff may be a marker interval of 2K bytes. The offset may be used to synchronize the marker interval with the starting sequence number of the stream. To calculate this offset, a host driver may take the starting sequence number of the connection and mask it with the interval mask.

An example may be an interval of 2K and a starting sequence number of 0xff434155. The driver may program a RECV_MARKER_MASK to 0x7ff and a RECV_MARKER_OFFSET to 0x155.

The transport offload engine may further calculate the number of bytes until the next marker. This may be accomplished by masking off the current sequence number, subtracting the offset, and taking the absolute value. A marker engine may also be turned on and incoming segments may be determined if a marker was contained in the segment. If so, the marker may be extracted and used to update the next PDU sequence number in the socket control block.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product stored in a non-transitory computer readable medium, comprising:
   computer code including a data object for communicating between a first network protocol layer and a second network protocol layer;
   wherein the data object facilitates network communication management utilizing a transport offload engine;
   wherein the data object is stored with a data list in at least one queue;
   wherein an indicator distinguishes between the data list and the data object in the at least one queue;
   wherein information associated with data to be transmitted in a network is written to the at least one queue, wherein the information in the at least one queue includes a bit indicating whether the information is to be processed as the data list or data object, each data list having an address in memory where the data to be transmitted is stored, a length associated with the data, and a flag indicating whether the data is to include a cyclic redundancy check (CRC), the data object including a byte indicator indicating a number of bytes until a subsequent protocol data unit (PDU) or a CRC indicator used to clear a CRC of a socket to zero;
   wherein an instruction message transmitted from a processor to the transport offload engine indicates a start of the at least one queue, an end of the at least one queue, and a next read pointer;
   wherein the information is accessed from the processor by the transport offload engine utilizing the instruction message via direct memory access (DMA) operations;

wherein each data list is processed by the transport offload engine by accessing the data to be transmitted, segmenting the data, and transmitting the data in the network;

wherein the data object includes the CRC indicator, and wherein the transport offload engine generates a calculated CRC, transmitting the CRC with the data in the network, and transmitting to the processor a status message that includes the CRC;

wherein the CRC is stored in response to the status message and used during a retransmission request without recalculation.

2. The computer program product as recited in claim 1, wherein the first network protocol layer includes a transport protocol layer.

3. The computer program product as recited in claim 2, wherein the second network protocol layer includes a layer above the transport protocol layer.

4. The computer program product as recited in claim 3, wherein the second network protocol layer includes a small computer system interface (SCSI) protocol.

5. The computer program product as recited in claim 3, wherein the second network protocol layer is selected from the group consisting of an Internet small computer system interface (iSCSI) protocol, a remote direct memory access (RDMA) protocol, a direct data placement (DDP) protocol, a markers with protocol data unit (PDU) alignment (MPA) protocol, and a network file system (NFS) protocol.

6. The computer program product as recited in claim 1, wherein the data object includes the metadata.

7. The computer program product as recited in claim 1, wherein the data object is communicated between the processor and the transport offload engine.

8. The computer program product as recited in claim 1, wherein the data list includes at least one of a scatter-gather list (SGL) and a memory-descriptor list (MDL).

9. The computer program product as recited in claim 7, wherein the processor communicates the instruction message to the transport offload engine identifying a location in memory where the data list and the data object are stored.

10. The computer program product as recited in claim 1, wherein the data object communicates state information associated with the second network protocol layer to the first network protocol layer, wherein the first network protocol layer resides below the second network protocol layer.

11. The computer program product as recited in claim 1, wherein the data object communicates state information associated with the first network protocol layer to the second network protocol layer, wherein the first network protocol layer resides below the second network protocol layer.

12. The computer program product as recited in claim 1, wherein the data object includes the metadata including the byte indicator.

13. The computer program product as recited in claim 1, wherein the data object includes a start indicator.

14. The computer program product as recited in claim 13, wherein the start indicator is adapted for indicating a start of a protocol data unit (PDU).

15. The computer program product as recited in claim 1, wherein the data object includes an end indicator.

16. The computer program product as recited in claim 15, wherein the end indicator is adapted for indicating an end of a protocol data unit (PDU).

17. The computer program product as recited in claim 1, wherein the data object includes a data integrity check.

18. The computer program product as recited in claim 17, wherein the data integrity check includes the cyclic redundancy check (CRC) indicator.

19. The computer program product as recited in claim 17, wherein the data integrity check includes the cyclic redundancy check (CRC) indicator, and the CRC indicator prompts calculation of the CRC, and transmission of the CRC with the data communicated in the network.

20. The computer program product as recited in claim 19, wherein the CRC indicator prompts transmission of the status message to the processor that includes the CRC.

21. The computer program product as recited in claim 1, wherein the transport offload engine utilizes the data object to process data associated with an upper one of the network protocol layers.

22. The computer program product as recited in claim 21, wherein the processed data is inserted into a data stream in which the data is communicated utilizing the transport offload engine.

23. The computer program product as recited in claim 21, wherein the processed data is fed back to the processor for retransmission purposes.

24. The computer program product as recited in claim 21, wherein the processing is offloaded from the processor.

25. The computer program product as recited in claim 21, wherein the data is only transmitted between the processor and the transport offload engine once.

26. The computer program product as recited in claim 1, wherein the data object includes a transmission control protocol urgent (TCP URG) indicator.

27. The computer program product as recited in claim 26, wherein the TCP URG indicator is adapted for indicating a number of bytes until a TCP URG section is complete.

28. The computer program product as recited in claim 1, wherein the data list points to a 4-byte data segment and includes a dump CRC bit.

29. The computer program product as recited in claim 1, wherein the data object includes an acknowledgment indicator.

30. The computer program product as recited in claim 29, wherein the acknowledgment indicator is used for indicating a portion of the at least one queue that no longer needs to be stored.

31. A system, comprising:
a processor; and
a transport offload engine in communication with the processor and a network via a bus, the transport offload engine capable of processing a data object for communicating between a first network protocol layer and a second network protocol layer;
wherein the data object facilitates network communication management utilizing the transport offload engine;
wherein the data object is stored with a data list in at least one queue;
wherein an indicator distinguishes between the data list and the data object in the at least one queue;
wherein utilizing the processor to write to the at least one queue information associated with data to be transmitted in a network, wherein the information in the at least one queue includes a bit indicating whether the information is to be processed as a data list or the data object, each data list having an address in memory where the data to be transmitted is stored, a length associated with the data, and a flag indicating whether the data is to include a cyclic redundancy check (CRC), the data object including a byte indicator indicating a number of bytes until a subsequent protocol data unit (PDU) or a CRC indicator used to clear a CRC of a socket to zero;
wherein utilizing the processor to transmit an instruction message to the transport offload engine for indicating a start of the at least one queue, an end of the at least one queue, and a next read pointer;
wherein utilizing the transport offload engine to performs operations of:
accessing the information from the processor utilizing the instruction message via direct memory access (DMA) operations,
processing each data list by accessing the data to be transmitted, segmenting the data, and transmitting the data in the network,
wherein the data object includes the CRC indicator, and further comprising generating a calculated CRC, transmitting the CRC with the data in the network, and
transmitting to the processor a status message that includes the CRC; and
wherein the processor stores the CRC in response to the status message and used during a retransmission request without recalculation.

32. A method, comprising:
receiving data utilizing a transport offload engine in communication with a processor and a network; and
processing a data object for communicating between a first network protocol layer and a second network protocol layer;
wherein the data object facilitates network communication management utilizing the transport offload engine;
wherein the data object is stored with a data list in at least one queue;
wherein an indicator distinguishes between the data list and the data object in the at least one queue;
wherein utilizing the processor to write to the at least one queue information associated with data to be transmitted in a network, wherein the information in the at least one queue includes a bit indicating whether the information is to be processed as a data list or data object, each data list having an address in memory where the data to be transmitted is stored, a length associated with the data, and a flag indicating whether the data is to include a cyclic redundancy check (CRC), the data object including a byte indicator indicating a number of bytes until a subsequent protocol data unit (PDU) or a CRC indicator used to clear a CRC of a socket to zero;
wherein utilizing the processor to transmit an instruction message to the transport offload engine for indicating a start of the at least one queue, an end of the at least one queue, and a next read pointer;
wherein utilizing the transport offload engine to performs operations of:
accessing the information from the processor utilizing the instruction message via direct memory access (DMA) operations,
processing each data list by accessing the data to be transmitted, segmenting the data, and transmitting the data in the network,
wherein the data object includes the CRC indicator, and further comprising generating a calculated CRC, transmitting the CRC with the data in the network, and
transmitting to the processor a status message that includes the CRC; and
wherein utilizing the processor to store the CRC in response to the status message and used during a retransmission request without recalculation.

33. A method for communicating data in a network, comprising:
utilizing a processor, writing to a queue information associated with data to be transmitted in a network, wherein the information in the queue includes a bit indicating whether the information is to be processed as a data list or metadata, each data list having an address in memory where the data to be transmitted is stored, a length associated with the data, and a flag indicating whether the data is to include a cyclic redundancy check (CRC), the metadata including a byte indicator indicating a number of bytes until a subsequent protocol data unit (PDU) or a CRC indicator used to clear a CRC of a socket to zero;
transmitting an instruction message from the processor to a transport offload engine for indicating a start of the queue, an end of the queue, and a next read pointer;
utilizing the transport offload engine to perform the operation of:
accessing the information from the processor utilizing the instruction message via direct memory access (DMA) operations,
processing each data list by accessing the data to be transmitted, segmenting the data, and transmitting the data in the network,
wherein the metadata includes the CRC indicator, and further comprising generating a calculated CRC, transmitting the CRC with the data in the network, and
transmitting to the processor a status message that includes the CRC; and
utilizing the processor, storing the CRC in response to the status message and used during a retransmission request without recalculation.

34. The method as recited in claim 33, the queue is provided for one of a plurality of sockets.

35. The method as recited in claim 34, wherein a control block is provided to track transmission of the data via the one of the plurality of sockets.

* * * * *